United States Patent
Boettcher

(10) Patent No.: US 7,166,008 B2
(45) Date of Patent: Jan. 23, 2007

(54) METHOD OF CURING USING AN ELECTROLUMINESCENT LIGHT

(75) Inventor: Robert J. Boettcher, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 253 days.

(21) Appl. No.: 10/744,260

(22) Filed: Dec. 22, 2003

(65) Prior Publication Data

US 2005/0136210 A1   Jun. 23, 2005

(51) Int. Cl.
*H01J 9/00*   (2006.01)

(52) U.S. Cl. .......................... 445/24; 445/25; 313/348; 313/503; 313/504; 313/505; 313/506; 313/498; 428/76; 428/690; 428/917; 257/98; 427/553; 427/559

(58) Field of Classification Search ................ 313/498, 313/348, 503–506; 428/76, 690, 917; 257/98; 445/24, 25; 427/553, 559
See application file for complete search history.

(56) References Cited

U.S. PATENT DOCUMENTS

| | | | |
|---|---|---|---|
| 3,708,296 A | 1/1973 | Schlesinger |
| 3,741,769 A | 6/1973 | Smith |
| 3,808,006 A | 4/1974 | Smith |
| 4,216,288 A | 8/1980 | Crivello |
| 4,250,053 A | 2/1981 | Smith |
| 4,250,311 A | 2/1981 | Crivello |
| 4,394,403 A | 7/1983 | Smith |
| 4,642,126 A | 2/1987 | Zador et al. |
| 4,652,274 A | 3/1987 | Boettcher et al. |
| 4,772,530 A | 9/1988 | Gottschalk et al. |
| 4,874,450 A | 10/1989 | Gottschalk |
| 4,916,169 A | 4/1990 | Boardman et al. |
| 4,954,414 A | 9/1990 | Adair et al. |
| 4,985,340 A | 1/1991 | Palazzotto et al. |
| 5,055,372 A | 10/1991 | Shanklin et al. |
| 5,057,393 A | 10/1991 | Shanklin et al. |
| 5,089,536 A | 2/1992 | Palazzotto |
| 5,124,417 A | 6/1992 | Farooq |
| 5,145,886 A | 9/1992 | Oxman et al. |
| 5,318,999 A | 6/1994 | Mitra et al. |
| 5,349,269 A | 9/1994 | Kimball |
| 5,485,355 A | 1/1996 | Voskoboinik et al. |
| 5,545,676 A | 8/1996 | Palazzotto et al. |
| 5,856,373 A | 1/1999 | Kaisaki et al. |
| 5,876,805 A | 3/1999 | Ostlie |
| 5,998,495 A | 12/1999 | Oxman et al. |
| 6,025,406 A | 2/2000 | Oxman et al. |

(Continued)

FOREIGN PATENT DOCUMENTS

EP     173567     3/1986

*Primary Examiner*—Mariceli Santiago
*Assistant Examiner*—Anthony Canning
(74) *Attorney, Agent, or Firm*—Douglas B. Little

(57) ABSTRACT

Method of curing polymeric compositions using light from an electroluminescent light source. An electroluminescent wire light can be embedded into a curable polymer or adhesive composition and used for curing in circumstances in which UV or visible light from conventional lamps cannot reach the polymer or adhesive to be cured. It may also be used to cure polymer or adhesive coatings of unusual or irregular shapes. An electroluminescent wire light can be embedded in a curable adhesive or polymer compound around an irregular shape of boat hull components, and the emitted light used to cure the adhesive or polymer compound to bond the boat hull components.

20 Claims, 1 Drawing Sheet

U.S. PATENT DOCUMENTS 6,204,350 B1  3/2001  Liu et al.
6,611,096 B1  8/2003  McCormick et al.
2003/0099858 A1*  5/2003  Duggal et al. .............. 428/690

* cited by examiner

METHOD OF CURING USING AN ELECTROLUMINESCENT LIGHT

FIELD

This invention relates to a method of curing a curable composition using a source of electroluminescent light.

BACKGROUND

A desirable property for an adhesive composition may be described as "cure-on-demand". Adhesives that can be cured-on-demand characteristically have an extended (or indefinite) open time and can be rapidly cured at a desired time by the user.

Adhesive bonding two or more objects together has two objectives: a long open time (time before the adhesive cures) for applying the adhesive so that substrates are brought into reasonable alignment; and rapid curing of the adhesive once alignment has been completed. These interests are neatly summed up in the phrase "Cure on Demand" (COD), so often heard in the adhesive industry.

Cure on demand has been addressed in a variety of ways depending on the method used to effect curing. These methods include exposure to air or moisture, exposure to vaporous chemicals such as volatile amines, or exposure of the adhesive to heat or radiation or combinations thereof.

One type of cure-on-demand adhesive is ultraviolet (UV) light curable adhesives. These adhesives typically comprise a curable monomeric or oligomeric material (e.g., an acrylate or methacrylate) along with a UV sensitive initiator. Exposure of the uncured composition to UV light initiates cure of the adhesive on demand. Although UV curable adhesive are desirable, the adhesive to be cured must be positioned so that it can be conveniently exposed to the source of UV light in a direct "line of sight" relationship. Therefore, cure between opaque substrates cannot easily be achieved.

SUMMARY OF THE INVENTION

The invention provides a method of curing a curable composition using an electroluminescent light source. The method comprises the steps of: (a) providing a curable composition; (b) providing an electroluminescent light source having a light emitting region; and (c) curing the curable composition by exposing the curable composition to light emitted from the light emitting region of the electroluminescent light source.

The inventive method takes advantage of curable composition formulations that cure in the presence of visible light and do not require UV light to cure. It enables one to bond objects in circumstances in which conventional light sources cannot illuminate the photocurable material because the adhesive can not conveniently be exposed to light, e.g., because the object to be bonded is opaque. It also enables curing extended and/or hidden bond lines in locations not accessible to typical curing lamps.

Long electroluminescent lamps used in the inventive method can emit a uniform intensity of light along the complete length of a bond line, including bond lines that follow a tortuous path. Examples of such applications include, but are not limited to glass bonding on windshields, panel bonding on automobile bodies and boats or hull bonding in boat construction.

DETAILED DESCRIPTION

Figure 1:
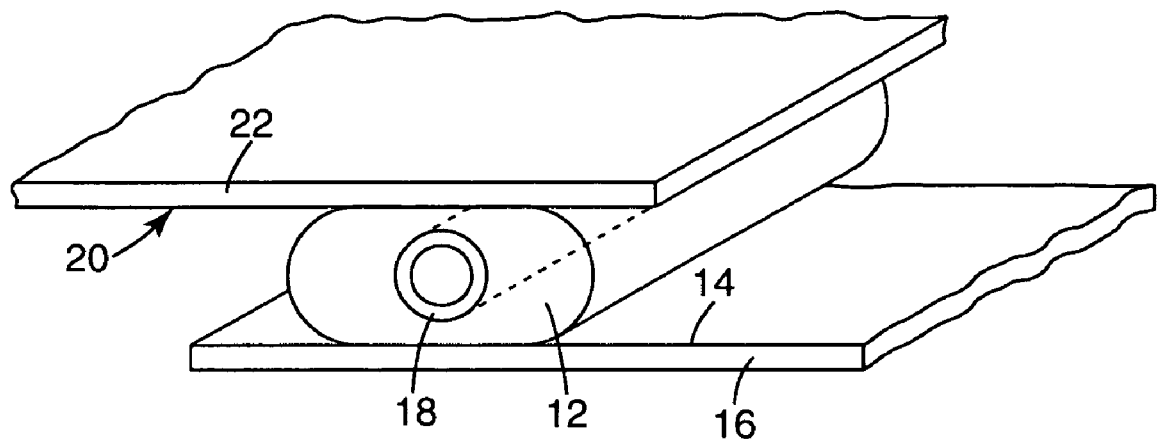
FIG. 1 is a cross sectional view of one example of the invention, showing the curable composition and electroluminescent positioned between two substrates as they would be for the operation of the inventive method.

According to the present invention, substrates are bonded together using a photocurable resin in the presence of an electroluminescent light, for example in the form of a light fiber. An exemplary process is illustrated in FIG. 1 wherein photocurable resin composition 12 is applied to the first major surface 14 of substrate 16. An electroluminescent light fiber 18 is embedded into the photocurable resin composition 12. A second major surface 20 of a second substrate 22 is brought into contact with the photocurable resin composition 12. Voltage is applied to electroluminescent light fiber 18 by means of a power supply not shown, resulting in light emission at a suitable wavelength and of sufficient lux to cure resin composition 12, thereby bonding substrates 16 and 22.

For purposes of this description, the term "electroluminescent light" means an article that generates light from electrical energy applied to a light emitting material embedded, encased or contained within a polymeric or glass material. The term electroluminscent light does not include lighting devices that include a vacuum container such as conventional lighting tubes or bulbs. Electroluminescent (EL) light sources are known in the art and include point light sources such a light-emitting diodes (LED) and electroluminescent light-emitting screens which are used as back lighting for control panel displays. EL light sources also include organic light emitting devices powered by direct current such as described in U.S. Pat. No. 6,611,096.

A known construction of an electroluminescent light includes a transparent flexible substrate material having a transparent electrically conductive layer on it, which serves as a first electrode. A layer comprising a mass or multiplicity of special phosphors, referred to as electroluminophors (which emit light when excited by a capacitively coupled AC electric field) dispersed in a dielectric binder, is applied to the conductive layer. Another conductive layer is applied to the phosphor layer, forming a second electrode. Further detail on the functioning of EL lamps based on inorganic phosphors is in U.S. Pat. No. 5,349,269 (Kimball). Such inorganic phosphor EL lamps are essentially capacitors that glow in the presence of a strong electric field and a very low current because of the phosphor powder (electroluminophors). Alternating current can be supplied to an EL lamp by means of inverters, also described in U.S. Pat. No. 5,349,269.

A particularly suitable electroluminescent light source is described in U.S. Pat. No. 5,485,355 (Voskoboinik et al.). This source is a flexible, EL light source in the form of a cable. The cable EL light source comprises at least two electrodes mutually disposed in such a way as to create between them an electric field when an AC voltage is applied to them. At least one type of a powdered electroluminophor dispersed in a dielectric binder is disposed in such a proximity to electrodes as to be effectively excited by the electric field created and emit light of a specific color. The electrodes and electroluminophor can be encased in a transparent polymer sheath. EL sources of the type described above are available, for example, from ELAM Industries Inc. of Jerusalem Israel. Such an EL cable or wire can conform to an irregularly shaped article having a coating of a curable composition, in order to cure the composition, such as an adhesive or polymer (e.g., a glazing compound). Optionally, a second transparent polymeric sheath may encase EL fiber so that the fiber can slide out of the sheath, thereby facilitating removal of the EL fiber after the curing step.

"Actinic radiation" means photochemically active radiation and particle beams, including, but not limited to, accelerated particles, for example, electron beams; and electromagnetic radiation, for example, microwaves, infrared radiation, visible light, ultraviolet light, X-rays, and gamma-rays. "UV" or "ultraviolet" means actinic radiation having a spectral output between about 200 and about 400 nanometers (nm.). Wavelengths above 300 nm are considered actinic radiation for purposes of this application. More preferably, actinic radiation useful in the present invention includes wavelengths within the range 300 to 1200 rm. Visible light (such as that emitted by an EL lamp) is generally in the range of 400–700 nm wavelength.

"Cure" means to initiate a chemical reaction in which molecules chemically combine to form linear and/or branched polymer or in which polymers are cross-linked. Curable compositions as defined in this invention are those that undergo conversion from a less viscous to an insoluble composition. In particular they include photocurable adhesive compositions that harden when their functional groups absorb light in the ultraviolet to the visible region. These groups could be in the form of monomers, oligomers, prepolymers or additives which yield electronically excited states that induce crosslinking directly or by energy transfer via formation of reactive intermediates such as free radicals, reactive cations or other means which subsequently initiate crosslinking of macromolecular chains.

The curable compositions useful in the present invention may be in the form of a liquid, gel, or solid and may be free-radically polymerizable and/or cationically-polymerizable. Such compositions comprise a photopolymerizable moiety and a visible- and/or near infrared-light photoinitiator therefor.

Free Radically Curable Compositions:

Free-radically polymerizable curable compositions comprise at least one free radically-polymerizable or cross-linkable molecule and a photoinitiation system that can be initiated by light having a wavelength in the range of about 300 nm to about 1200 nm.

Suitable free radically-polymerizable molecules contain at least one ethylenically-unsaturated double bond and may be monomeric or oligomeric. Such molecules include mono-, di- or poly-acrylates and methacrylates such as methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethyl-methane, bis[1-(3-acryloxy-2-hydroxy)]-p-propoxyphenyldimethyl-methane, tris(hydroxyethylisocyanurate) trimethacrylate; the bis-acrylates and bis-methacrylates of polyethylene glycols of molecular weight 200–500, copolymerizable mixtures of acrylated monomers such as those of U.S. Pat. No. 4,652,274 (Boettcher et al.), incorporated herein by reference, and acrylated oligomers such as those of U.S. Pat. No. 4,642,126 (Zador et al.), incorporated herein by reference; unsaturated amides such as methylene bis-acrylamide, methylene bis-methacrylamide, 1,6-hexamethylene bis-acrylamide, diethylene triamine tris-acrylamide and beta-methacrylaminoethyl methacrylate; and vinyl compounds such as styrene, diallyl phthalate, divinyl succinate, divinyl adipate and divinylphthalate. Mixtures of two or more monomers can be used if desired.

A variety of visible or near-infra red photoinitiator systems may be used in the curable composition. For example, the monomer can be combined with a three-component (i.e., ternary) photoinitiator system. The first component in the photoinitiator system is the iodonium salt (i.e., a diaryliodonium salt). The iodonium salt is preferably soluble in the curable composition and is shelf-stable (i.e., does not spontaneously promote polymerization) when dissolved therein in the presence of the sensitizer and donor. Accordingly, selection of a particular iodonium salt may depend to some extent upon the particular curable material, sensitizer and donor. Examples of iodonium salts are described in U.S. Pat. No. 3,729,313 (Smith), U.S. Pat. No. 3,741,769 (Smith), U.S. Pat. No. 3,808,006 (Smith), U.S. Pat. No. 4,250,053 (Smith) and U.S. Pat. No. 4,394,403 (Smith), which are incorporated herein by reference. The iodonium salt may be a simple salt (e.g., containing an anion such as $Cl^-$, $Br^-$, $I^-$ or $C_4H_5SO_3^-$) or a metal complex salt (e.g., containing $SbF_5OH^-$ or $AsF_6^-$). Mixtures of iodonium salts may also be used. Preferred iodonium salts include diphenyliodonium salts such as diphenyliodonium chloride, diphenyliodonium hexafluorophosphate and diphenyliodonium tetrafluoroborate.

The photoinitiator system also includes a sensitizer. Sensitizing compounds are for cationically-curable materials are known in the art. The sensitizer desirably is soluble in the monomer, and is capable of light absorption somewhere within the range of wavelengths of greater than 300 to 1200 nanometers, more preferably greater than 400 to 700 nanometers and most preferably greater than 400 to about 600 nanometers. The sensitizer may also be capable of sensitizing 2-methyl-4,6-bis(trichloromethyl)-s-triazine, using the test procedure described in U.S. Pat. No. 3,729,313. Preferably, in addition to passing this test, a sensitizer is also selected based in part upon shelf stability considerations. Accordingly, selection of a particular sensitizer may depend to some extent upon the particular monomer, oligomer or polymer, iodonium salt and donor chosen.

The initiator system also includes a donor. Examples of donors include amines (including aminoaldehydes and aminosilanes), amides (including phosphoramides), ethers (including thioethers), ureas (including thioureas), ferrocene, sulfinic acids and their salts, salts of ferrocyanide, ascorbic acid and its salts, dithiocarbamic acid and its salts, salts of xanthates, salts of ethylene diamine tetraacetic acid and salts of tetraphenylboronic acid. The donor may be unsubstituted or substituted with one or more non-interfering substituents. Particularly preferred donors contain an electron donor atom such as a nitrogen, oxygen, phosphorus, or sulfur atom, and an abstractable hydrogen atom bonded to a carbon or silicon atom in an alpha position relative to the electron donor atom. Examples of donors are reported in U.S. Pat. No. 5,545,676 (Palazzotto at el.), which is incorporated herein by reference.

Free-radical initiators useful in the invention also may include the class of acylphosphine oxides, as described in European Patent Application No. 173567 (Ying).

Free-radical initiators useful in the invention also may include the class of ionic dye-counterion complex initiators comprising a borate anion and a complementary cationic dye.

Cationic counterions can be cationic dyes, quaternary ammonium groups, transition metal coordination complexes, and the like. Cationic dyes useful as counterions can be cationic methine, polymethine, triarylmethine, indoline, thiazine, xanthene, oxazine or acridine dyes. More specifically, the dyes may be cationic cyanine, carbocyanine, hemicyanine, rhodamine, and azomethine dyes. Specific examples of useful cationic dyes include Methylene Blue, Safranine O, and Malachite Green. Quaternary ammonium groups useful as counterions can be trimethylcetylammonium, cetylpyridinium, and tetramethylammonium. Other organophilic cations can include pyridinium, phosphonium, and sulfonium. Photosensitive transition metal coordination complexes that may be used include complexes of cobalt, ruthenium, osmium, zinc, iron, and iridium with ligands such as pyridine, 2,2'-bipyridine, 4,4'-dimethyl-2,2'-bipyridine, 1,10-phenanthroline, 3,4,7,8-tetramethylphenanthroline, 2,4,6-tri(2-pyridyl-s-triazine) and related ligands.

Borate salt photoinitiators are described, for example, in U.S. Pat. No. 4,772,530 (Gottschalk et al.), U.S. Pat. No. 4,954,414 (Adair et al.), U.S. Pat. No. 4,874,450 (Gottschalk), U.S. Pat. No. 5,055,372 (Shanklin et al.), and U.S. Pat. No. 5,057,393 (Shanklin et al.), the disclosures of which are incorporated herein by reference.

In another embodiment, a photopolymerization reaction useful in the invention includes the visible radiation-activated addition reaction of a compound containing silicon-bonded hydrogen with a compound containing aliphatic unsaturation. The addition reaction typically can be referred to as hydrosilation. Hydrosilation by means of visible light has been described, e.g., in U.S. Pat. No. 4,916,169 (Boardman et al.) and U.S. Pat. No. 5,145,886 (Oxman et al.), both of which are incorporated herein by reference.

Examples of organic materials polymerizable by cationic polymerization and suitable for the hardenable compositions according to the invention are of the following types, which may be used by themselves or as mixtures of at least two components:

A. Ethylenically unsaturated compounds polymerizable by a cationic mechanism. These include:
  1. Monoolefins and diolefins, for example isobutylene, butadiene, isoprene, styrene, α-methylstyrene, divinylbenzenes, N-vinylpyrrolidone, N-vinylcarbazole and acrolein.
  2. Vinyl ethers, for example methyl vinyl ether, isobutyl vinyl ether, trimethylolpropane trivinyl ether and ethylene glycol divinyl ether; and cyclic vinyl ethers, for example 3,4-dihydro-2-formyl-2H-pyran (acrolein dimer) and the 3,4-dihydro-2H-pyran-2-carboxylic acid ester of 2-hydroxymethyl-3,4-dihydro-2H-pyran.
  3. Vinyl esters, for example vinyl acetate and vinyl stearate.

B. Heterocyclic compounds polymerizable by cationic polymerization, for example ethylene oxide, propylene oxide, epichlorohydrin, glycidyl ethers of monohydric alcohols or phenols, for example n-butyl glycidyl ether, n-octyl glycidyl ether, phenyl glycidyl ether and cresyl glycidyl ether; glycidyl acrylate, glycidyl methacrylate, styrene oxide and cyclohexene oxide; oxetanes such as 3,3-dimethyloxetane and 3,3-di(chloromethyl)oxetane; tetrahydrofuran; dioxolanes, trioxane and 1,3,6-trioxacyclooctane; spiroorthocarbonates; lactones such as β-propiolactone, γ-valerolactone and ε-caprolactone; thiiranes such as ethylene sulfide and propylene sulfide; azetidines such as N-acylazetidines, for example N-benzoylazetidine, as well as the adducts of azetidine with diisocyanates, for example toluene-2,4-diisocyanate and toluene-2,6-diisocyanate and 4,4'-diaminodiphenylmethane diisocyanate; epoxy resins; and linear and branched polymers with glycidyl groups in the side-chains, for example homopolymers and copolymers of polyacrylate and polymethacrylate glycidyl esters.

Of particular importance among these above-mentioned polymerizable compounds are the epoxy resins and especially the diepoxides and polyepoxides and epoxy resin prepolymers of the type used to prepare crosslinked epoxy resins.

Epoxy compounds that can be cured or polymerized by the processes of this invention are those known to undergo cationic polymerization and include 1,2-, 1,3-, and 1,4-cyclic ethers (also designated as 1,2-, 1,3-, and 1,4-epoxides). The "Encyclopedia of Polymer Science and Technology", 6, (1986), p. 322, provides a description of suitable epoxy resins. In particular, cyclic ethers that are useful include the cycloaliphatic epoxies such as cyclohexene oxide and the series of resins commercially available under the trade designation "ERL" from Dow Chemical Co., Midland, Mich., such as vinylcyclohexene oxide, vinylcyclohexene dioxide (trade designation "ERL 4206"), 3,4-epoxy-6-methylcyclohexylmethyl-3,4-epoxy-6-methyl-cyclohexene carboxylate (trade designation "ERL 4201"), bis (2,3-epoxycyclopentyl) ether (trade designation "ERL 0400"), 3,4-epoxycyclohexylmethyl-3,4-epoxycyclohexane carboxylate (trade designation "ERL 4221"), bis-(3,4-epoxycyclohexyl) adipate (trade designation "ERL 4289"), aliphatic epoxy modified from polypropylene glycol (trade designations "ERL 4050" and "ERL 4052"), dipentene dioxide (trade designation "ERL 4269"), and 2-(3,4-epoxycyclo-hexyl-5,5-spiro-3,4-epoxy) cyclohexene-meta-dioxane (trade designation "ERL 4234"); also included are the glycidyl ether type epoxy resins such as propylene oxide, epichlorohydrin, styrene oxide, glycidol, the series of epoxy resins commercially available under the trade designation "EPON" from Shell Chemical Co., Houston, Tex., including the diglycidyl ether of bisphenol A and chain extended versions of this material such as those having the trade designation "EPON 828", "EPON 1001", "EPON 1004", "EPON 1007", "EPON 1009" and "EPON 2002" or their equivalent from other manufacturers; dicyclopentadiene dioxide; epoxidized vegetable oils such as epoxidized linseed and soybean oils commercially available under the trade designations "VIKOLOX" and "VIKOFLEX" from Elf Atochem North America, Inc., Philadelphia, Pa.; epoxidized liquid polymers having the trade designation "KRATON", such as "L-207" commercially available from Shell Chemical Co.; epoxidized polybutadienes such as those having the trade designation "POLY BD" from Elf Atochem; 1,4-butanediol diglycidyl ether, polyglycidyl ether of phenolformaldehyde; epoxidized phenolic novolac resins such as those commercially available under the trade designations "DEN 431" and "DEN 438" from Dow Chemical Co.; epoxidized cresol novolac resins such as the one commercially available under the trade designation "ARALDITE ECN 1299" from Vantico, Inc. Brewster, N.Y.; resorcinol diglycidyl ether; epoxidized polystyrene/polybutadiene blends such as those commercially available under the trade designation "EPOFRIEND" such as "EPOFRIEND A1010" from Daicel USA Inc., Fort Lee, N.J.; the series of alkyl glycidyl ethers commercially available under the trade designation "HELOXY" from Shell Chemical Co., Houston, Tex., such as alkyl $C_8$–$C_{10}$ glycidyl ether (trade designation "HELOXY MODIFIER 7"), alkyl $C_{12}$–$C_{14}$ glycidyl ether (trade designation "HELOXY MODIFIER 8"), butyl glycidyl ether (trade designation "HELOXY MODIFIER 61"), cresyl glycidyl ether (trade designation "HELOXY MODIFIER 62"), p-tert-butylphenyl glycidyl ether (trade designation HELOXY MODIFIER 65"), polyfunctional glycidyl ethers such as diglycidyl ether of 1,4-butanediol (trade designation HELOXY MODIFIER 67"), diglycidyl ether of neopentyl glycol (trade designation "HELOXY MODIFIER 68"), diglycidyl ether of cyclohexanedimethanol (trade designation "HELOXY MODIFIER 107"), trimethylol ethane triglycidyl ether (trade designation "HELOXY MODIFIER 44"), trimethylol propane triglycidyl ether (trade designation "HELOXY MODIFIER 48"), polyglycidyl ether of an aliphatic polyol (trade designation "HELOXY MODIFIER 84"), polyglycol diepoxide (trade designation "HELOXY MODIFIER 32"); and bisphenol F epoxides.

The preferred epoxy resins include the "ERL" type of resins especially 3,4-epoxycyclohexylmethyl-3,4-epoxycyclohexanecarboxylate, bis-(3,4-epoxycyclohexyl) adipate and 2-(3,4-epoxycylclohexyl-5,5-spiro-3,4-epoxy) cyclohexene-meta-dioxane and the bisphenol A "EPON" type resins including 2,2-bis-(p-(2,3-epoxypropoxy)phenylpropane) and chain extended versions of this material. It is also within the scope of this invention to use a blend of more than one epoxy resin.

It is also within the scope of this invention to use one or more epoxy resins blended together. The different kinds of resins can be present in any proportion.

Optionally, monohydroxy- and polyhydroxy-alcohols may be added to the curable compositions of the invention, as chain-extenders for the epoxy resin. The hydroxyl-containing material used in the present invention can be any organic material having hydroxyl functionality of at least 1, and preferably at least 2.

Preferably the hydroxyl-containing material contains two or more primary or secondary aliphatic hydroxyl groups (i.e., the hydroxyl group is bonded directly to a non-aromatic carbon atom). The hydroxyl groups can be terminally situated, or they can be pendent from a polymer or copolymer. The molecular weight of the hydroxyl-containing organic material can vary from very low (e.g., 32) to very high (e.g., one million or more). Suitable hydroxyl-containing materials can have low molecular weights, i.e., from about 32 to 200, intermediate molecular weight, i.e., from about 200 to 10,000, or high molecular weight, i.e., above about 10,000. As used herein, all molecular weights are weight average molecular weights.

The hydroxyl-containing material can optionally contain other functionalities that do not substantially interfere with cationic cure at room temperature. Thus, the hydroxyl-containing materials can be nonaromatic in nature or can contain aromatic functionality. The hydroxyl-containing material can optionally contain heteroatoms in the backbone of the molecule, such as nitrogen, oxygen, sulfur, and the like, provided that the ultimate hydroxyl-containing material does not substantially interfere with cationic cure at room temperature. The hydroxyl-containing material can, for example, be selected from naturally occurring or synthetically prepared cellulosic materials. The hydroxyl-containing material is also substantially free of groups which may be thermally or photolytically unstable; that is, the material will not decompose or liberate volatile components at temperatures below about 100° C. or in the presence of actinic light which may be encountered during the desired curing conditions for the photocopolymerizable composition.

Useful hydroxyl-containing materials are described, for example, in U.S. Pat. No. 5,856,373 (Kaisaki et al.), which is incorporated herein by reference.

Any cationically-reactive vinyl ether may be used in the polymerizable compositions of the present invention. Examples of vinyl ethers that may be used include tri (ethyleneglycol) divinyl ether, commercially available under the trade designation "RAPI-CURE DVE-3", from International Specialty Products, Wayne, N.J., di(ethyleneglycol) divinyl ether, di(ethyleneglycol) monovinyl ether, ethylene glycol monovinyl ether, triethyleneglycol methyl vinyl ether, tetraethyleneglycol divinyl ether, glycidyl vinyl ether, butanediol vinyl ether, butanediol divinyl ether, 1,4-cyclohexanedimethanol divinyl ether commercially available under the trade designation "RAPI-CURE CHVE" from International Specialty Products, 1,4-cyclohexanedimethanol monovinyl ether, 4-(1-propenyloxymethyl)-1,3-dioxolan-2-one, 2-chloroethyl vinyl ether, 2-ethylhexyl vinyl ether, methyl vinyl ether, ethyl vinyl ether, n-propyl vinyl ether, isopropyl vinyl ether, n-, iso- and t-butyl vinyl ethers, octadecyl vinyl ether, cyclohexyl vinyl ether, 4-hydroxybutyl vinyl ether, t-amyl vinyl ether, dodecyl vinyl ether, hexanediol di- and mono-vinyl ethers, trimethylolpropane trivinyl ether, commercially available under the trade designation "TMPTVE" from BASF Corp., Mount Olive, N.J., aminopropyl vinyl ether, poly(tetrahydrofuran) divinyl ether, divinyl ether resin commercially available under the trade designation "PLURIOL E200" from BASF Corp., ethylene glycol butyl vinyl ether, 2-diethylaminoethyl vinyl ether, dipropylene glycol divinyl ether, and the divinyl ether resins commercially available under the trade designation "VECTOMER" from Morflex Inc., Greensboro, N.C., such as a vinyl ether terminated aromatic urethane oligomer (trade designations "VECTOMER 2010" and "VECTOMER 2015"), a vinyl ether terminated aliphatic urethane oligomer (trade designation "VECTOMER 2020"), hydroxybutyl vinyl ether isophthalate (trade designation "VECTOMER 4010"), and cyclohexane dimethanol monovinyl ether glutarate (trade designation "VECTOMER 4020"), or their equivalent from other manufacturers. It is within the scope of this invention to use a blend of more than one vinyl ether resin.

It is also within the scope of this invention to use one or more epoxy resins blended with one or more vinyl ether resins. The different kinds of resins can be present in any proportion.

Bifunctional monomers may also be used and examples that are useful in this invention possess at least one cationically polymerizable functionality or a functionality that copolymerizes with cationically polymerizable monomers, e.g., functionalities that will allow an epoxy-alcohol copolymerization.

When two or more polymerizable compositions are present, they can be present in any proportion.

The broad class of cationic photoactive groups recognized in the catalyst and photoinitiator industries may be used in the practice of the present invention. Photoactive cationic nuclei, photoactive cationic moieties, and photoactive cationic organic compounds are art recognized classes of materials as exemplified by U.S. Pat. No. 4,250,311 (Crivello); U.S. Pat. No. 3,708,296 (Schlesinger); U.S. Pat. No. 4,069,055 (Crivello); U.S. Pat. No. 4,216,288 (Crivello); U.S. Pat. No. 5,084,586 (Farooq); U.S. Pat. No. 5,124,417 (Farooq); U.S. Pat. No. 4,985,340 (Palazzotto et al.), U.S. Pat. N5,089,536 (Palazzotto), and U.S. Pat. No. 5,856,373 (Kaisaki et al.), each of which is incorporated herein by reference.

The cationically-curable materials can be combined with a three-component or ternary photoinitiator system. Three-component initiator systems are described in U.S. Pat. No. 5,545,676 (Palazzotto et al.), U.S Pat. No. 6,025,406 (Oxman et al.) and U.S Pat. No. 5,998,495 (Oxman et al.), each of which is incorporated herein by reference. The first component in the photoinitiator system can be an iodonium salt, i.e., a diaryliodonium salt. The iodonium salt desirably is soluble in the monomer and preferably is shelf-stable, meaning it does not spontaneously promote polymerization when dissolved therein in the presence of the sensitizer and donor. Accordingly, selection of a particular iodonium salt may depend to some extent upon the particular monomer, sensitizer and donor chosen. Suitable iodonium salts are described in U.S. Pat. No. 3,729,313 (Smith), U.S Pat. No. 3,741,769 (Smith), U.S Pat. No. 3,808,006 (Smith), U.S Pat. No. 4,250,053 (Crivello) and U.S Pat. No. 4,394,403 (Smith), the iodonium salt disclosures of which are incorporated herein by reference. The iodonium salt can be a simple salt, containing an anion such as $Cl^{31}$, $Br^{31}$, $I^-$or $C^4H_5SO_3^{31}$; or a metal complex salt containing an antimonate, arsenate, phosphate or borate such as $SbF_5OH^{31}$ or $AsF_6^{31}$. Mixtures of Iodonium salts can be used if desired.

Examples of useful aromatic iodonium complex salt photoinitiators include: diphenyliodonium tetrafluoroborate; di(4-methylphenyl)iodonium tetrafluoroborate; phenyl-4-methylphenyliodonium tetrafluoroborate; di(4-heptylphenyl)iodonium tetrafluoroborate; di(3-nitrophenyl)iodonium hexafluorophosphate; di(4-chlorophenyl)iodonium hexafluorophosphate; di(naphthyl)iodonium tetrafluoroborate; di(4-trifluoromethylphenyl)iodonium tetrafluoroborate; diphenyliodonium hexafluorophosphate; di(4-methylphenyl)iodonium hexafluorophosphate; diphenyliodonium hexafluoroarsenate; di(4-phenoxyphenyl)iodonium tetrafluoroborate; phenyl-2-thienyliodonium hexafluorophosphate; 3,5-dimethylpyrazolyl-4-phenyliodonium hexafluorophosphate; diphenyliodonium hexafluoroantimonate; 2,2'-diphenyliodonium tetrafluoroborate; di(2,4-dichlorophenyl)iodonium hexafluorophosphate; di(4-bromophenyl)iodonium hexafluorophosphate; di(4-methoxyphenyl)iodonium hexafluorophosphate; di(3-carboxyphenyl)iodonium hexafluorophosphate; di(3-methoxycarbonylphenyl)iodonium hexafluorophosphate; di(3-methoxysulfonylphenyl)iodonium hexafluorophosphate; di(4-acetamidophenyl)iodonium hexafluorophosphate; di(2-benzothienyl)iodonium hexafluorophosphate; and diphenyliodonium hexafluoroantimonate ($DPISbF_6$).

Of the aromatic iodonium complex salts which are useful in the inventive method diaryliodonium hexafluorophosphate and diaryliodonium hexafluoroantimonate are among the preferred salts. These salts are preferred because, in general, they promote faster reaction, and are more soluble in inert organic solvents than are other aromatic iodonium salts of complex ions.

The second component in the photoinitiator system is the sensitizer. The sensitizer desirably is soluble in the monomer, and is capable of light absorption within the range of wavelengths of greater than 300 to 1200 nanometers, and is chosen so as not to interfere with the cationic curing process Suitable sensitizers desirably include compounds in the following categories: ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Ketones (e.g., monoketones or alpha-diketones), ketocoumarins, aminoarylketones and p-substituted aminostyryl ketone compounds are preferred sensitizers. For applications requiring high sensitivity it is preferred to employ a sensitizer containing a julolidinyl moiety. For applications requiring deep cure (e.g., cure of highly-filled composites), it is preferred to employ sensitizers having an extinction coefficient below about 1000, more preferably below about 100, at the desired wavelength of irradiation for photopolymerization. Alternatively, dyes that exhibit reduction in light absorption at the excitation wavelength upon irradiation can be used.

A preferred class of ketone sensitizers has the formula:

in which X is CO or $CR^1 R^2$, where $R^1$ and $R^2$ can be the same or different, and can be hydrogen, alkyl, alkaryl or aralkyl, b is zero or one, and A and B can be the same or different and can be substituted (having one or more non-interfering substituents) or unsubstituted aryl, alkyl, alkaryl, or aralkyl groups, or together A and B can form a cyclic structure which can be a substituted or unsubstituted cycloaliphatic, aromatic, heteroaromatic or fused aromatic ring.

Suitable ketones of the above formula include monoketones (b=0) such as 2,2-, 4,4- or 2,4-dihydroxybenzophenone, di-2-pyridyl ketone, di-2-furanyl ketone, di-2-thiophenyl ketone, benzoin, fluorenone, chalcone, Michler's ketone, 2-fluoro-9-fluorenone, 2-chlorothioxanthone, acetophenone, benzophenone, 1- or 2-acetonaphthone, 9-acetylanthracene, 2-, 3- or 9-acetylphenanthrene, 4-acetylbiphenyl, propiophenone, n-butyrophenone, valerophenone, 2-, 3- or 4-acetylpyridine, 3-acetylcoumarin and the like. Suitable diketones include aralkyldiketones such as anthraquinone, phenanthrenequinone, o-, m- and p-diacetylbenzene, 1,3-, 1,4-, 1,5-, 1,6-, 1,7- and 1,8-diacetylnaphthalene, 1,5-, 1,8- and 9,10-diacetylanthracene, and the like. Suitable alpha-diketones (b=1 and X=CO) include 2,3-butanedione, 2,3-pentanedione, 2,3-hexanedione, 3,4-hexanedione, 2,3-heptanedione, 3,4-heptanedione, 2,3-octanedione, 4,5-octanedione, benzil, 2,2'-3 3'- and 4,4'-dihydroxylbenzil, furil, di-3,3'-indolylethanedione, 2,3-bornanedione (camphorquinone), biacetyl, 1,2-cyclohexanedione, 1,2-naphthaquinone, acenaphthaquinone, and the like.

The third component of the initiator system is an electron donor. The electron donor compound(s) desirably meets the requirements set forth in U.S. Pat. No. 6,025,406 (Jacobs et al.) and U.S. Pat. No. 5,998,495 (Jacobs et al.), each of which is incorporated herein by reference, and are soluble in the polymerizable composition. The donor can also be selected in consideration of other factors, such as shelf stability and the nature of the polymerizable materials, iodonium salt and sensitizer chosen. A class of donor compounds that may be useful in the inventive systems may be selected from some of the donors described in U.S. Pat. No. 5,545,676 (Palazzotto et al.).

The donor is typically an alkyl aromatic polyether or an N-alkyl arylamino compound wherein the aryl group is substituted by one or more electron withdrawing groups. Examples of suitable electron withdrawing groups include carboxylic acid, carboxylic acid ester, ketone, aldehyde, sulfonic acid, sulfonate and nitrile groups.

A preferred group of N-alkyl arylamino donor compounds is described by the following structural formula:

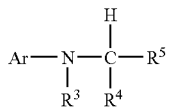

wherein each $R^3$, $R^4$ and $R^5$ can be the same or different, and can be H, $C_{1-18}$ alkyl that is optionally substituted by one or more halogen, —CN, —OH, —SH, $C_{1-18}$ alkoxy, $C_{1-18}$ alkylthio, $C_{3-18}$ cycloalkyl, aryl, COOH, COO$C_{1-18}$ alkyl, $(C_{1-18}$ alkyl$)_{0-1}$—CO—$C_{1-18}$ alkyl, $SO_3R^6$, CN or an aryl group that is optionally substituted by one or more electron withdrawing groups, or the $R^3$, $R^4$ or $R^5$ groups may be joined to form a ring; and Ar is aryl that is substituted by one or more electron withdrawing groups. Suitable electron withdrawing groups include —COOH, —COO$R^6$, —$SO_3R^6$, —CN, —CO—$C_{1-18}$ alkyl and —C(O)H groups, wherein $R^6$ can be a $C_{1-18}$ straight-chain, branched, or cyclic alkyl group.

Preferred donor compounds include 4-dimethylaminobenzoic acid, ethyl 4-dimethylaminobenzoate, 3-dimethylaminobenzoic acid, 4-dimethylaminobenzoin, 4-dimethylaminobenzaldehyde, 4-dimethylaminobenzonitrile and 1,2,4-trimethoxybenzene.

The photoinitiator compounds are provided in an amount effective to initiate or enhance the rate of cure of the resin system. The amount of donor used can be very important particularly when the donor is an amine. Too much donor can be deleterious to cure properties. Preferably, the sensitizer is present in about 0.05–5 weight percent based on resin compounds of the overall composition. More preferably, the sensitizer is present at 0.10–1.0 weight percent. The iodonium initiator is preferably present at 0.05–10.0 weight percent, more preferably at 0.10–5.0 weight percent, and most preferably 0.50–3.0 weight percent. Likewise, the donor is preferably present at 0.01–5.0 weight percent, more preferably 0.05–1.0 weight percent, and most preferably 0.05–0.50 weight percent.

Photo-polymerizable compositions useful in the invention are prepared by admixing, under "safe light" conditions (conditions under which curing is not initiated), the components as described above. Suitable inert solvents may be employed if desired when effecting this mixture. Any solvent may be used which does not react appreciably with the components of the inventive compositions. Examples of suitable solvents include acetone, dichloromethane, and acetonitrile. A liquid material to be polymerized may be used as a solvent for another liquid or solid material to be polymerized. Solventless compositions can be prepared by dissolving an aromatic iodonium complex salt and sensitizer in an epoxy resin-polyol mixture with or without the use of mild heating to facilitate dissolution.

An alternative photoinitiator system for cationic polymerizations includes the use of organometallic complex cations essentially free of metal hydride or metal alkyl functionality selected from those described in U.S. Pat. No. 4,985,340 (Palazzotto et al.)

Compositions useful in the invention can contain a wide variety of adjuvants depending upon the desired end use. Suitable adjuvants include solvents, diluents, resins, binders, plasticizers, pigments, dyes, inorganic or organic reinforcing or extending fillers (at preferred amounts of about 10% to about 90% by weight, based on the total weight of the composition), thixotropic agents, indicators, inhibitors, stabilizers, UV absorbers, and the like. Suitable amounts and types of such adjuvants, and their manner of addition to a composition of the invention are within the skill of the art.

The invention will be further clarified by the following examples. Unless otherwise noted, all parts, percentages, and ratios reported in the examples are on a weight basis, and all reagents used in the examples were obtained, or are available commercially from suppliers such as the Sigma-Aldrich Chemical Company, Saint Louis, Missouri, or may be synthesized by conventional techniques.

The following abbreviations are used in the following Examples:

"CR1": curable resin, bisphenol A diglycidyl ether dimethacrylate, commercially available from Polyscience, Inc., Warrington, Pa.;

"CR2": curable resin, triethyleneglycol dimethacrylate, commercially available under the trade designation "SR 205" from Sartomer, Inc., Exton, Pa.;

"CR3": curable resin, commercially available under the trade designation "CYRACURE UVR 6105", from Dow Chemical Company, Midland, Mich.;

"CR4": curable resin, commercially available under the trade designation "POLY THF 250" from BASF Corp., Mount Olive, N.J.;

"DYE1": Tetraiodotetrachlorofluorescein disodium salt, commercially available under the trade designation "ROSE BENGAL" from Mallinckrodt Baker, Inc., Phillipsburg, N.J.;

"DYE2": tetrabromofluoroscein:disodium salt, commercially available under the trade designation "EOSIN Y" from J Mallinckrodt Baker, Inc.;

"FS": fumed silica filler, commercially available under the trade designation "AEROSIL-976" from Degussa AG, Dusseldorf, Germany;

"SN1": sensitizer, camphorquinone, commercially available from Sigma-Aldrich Company;

"PI1": photoinitiator, diphenyliodonium hexafluorophosphate, commercially available from Sigma-Aldrich Company;

"ED1": electron donor, ethyl 4-dimethylamino benzoate, commercially available from Sigma-Aldrich Company;

"PI2": photoinitiator, commercially available under the trade "RHODORSIL 2074" from Rhodia Inc., Rock Hill, S.C.;

EXAMPLE 1

A curable composition was prepared as follows. A base solution was made by mixing together using a spatula in a black plastic container: 50 parts by weight CR1 and 50 parts by weight CR2. To this mixture was added 0.25 parts by weight SN1, 0.5 parts by weight PI1, 0.75 parts by weight PI3, 0.05 parts by weight DYE1, and 5 parts by weight FS.

The composition was stored in a lightproof container and had a paste-like consistency.

A 1-inch (2.54 cm) by 4-inches (10.16 cm) piece of sheet steel, coated with electro-deposited epoxy primer, commercially available under the trade designation "ACT COLD ROLLED STEEL 04X12X032 B952 P60 DIW: UNPOLISHED E-COAT: ED5000" from ACT Laboratories, Inc., Hillsdale, Mich. was laid on a flat surface. With room lights off a portion of the curable composition was applied to the sheet steel using a spatula.

A 15 foot (4.5 meter) electroluminescent light fiber, 2.3 millimeters outside diameter, having a peak emission at approximately 500 nanometers, commercially available as ELF BLUE-GREEN from ELAM, INC., was placed in the curable composition gel, passing through from side to side.

The distance from the power supply connection for the EL light source to the sheet steel sample was 20.3 cm. A second steel sheet, as described above, was placed on top of the curable composition so that it contacted the electroluminescent light source and the curable composition. This process was repeated at distances of: 40.5 cm, 58.4 cm, 139.7 cm, 195.6 cm, 214.9 cm, 416.9 cm, 424.2 cm, 434.3 cm and 449.6 cm from the power connection for the electroluminescent light fiber.

The electroluminescent light fiber was switched on, using a fixed output power supply, available from ELAM, Inc., with power input of 120 VAC, and output of 100 VAC at 3000 Hz. Periodically, sandwich bonds were pulled apart and the uncured curable composition was wiped away. The total width of the remaining cured material was measured with a dial caliper, and the results recorded, along with illumination time, and a net cure depth (NCD) calculated by subtracting the diameter of the fiber, and dividing the result by two. This value represented the depth of cure in one direction from the fiber. The results were tabulated in Table 1. Under the same set of conditions a sandwich bond without exposure to EL light showed no hardening of the photocuring gel.

TABLE 1

| Bond Distance from Power Supply, cm | Total Illumination Time, minutes | Total Width of Cure, mm | Net Cure Depth, mm |
| --- | --- | --- | --- |
| 20.3 | 13 | slight skin formed | n/a |
| 40.6 | 23 | 3.5 | .6 |
| 58.4 | 33 | 4 | .85 |
| 139.7 | 43 | 4.7 | 1.2 |
| 195.6–449.6 | 163 | 6–6.5 | 1.85–2.1 |

The above data show that the depth of cure into the curable composition is time related, and the light output from the EL device is uniform along the cable, since the specimens at different distances from the power connection cured relatively consistently.

EXAMPLE 2

Six sandwich bonds were prepared as described Example 1, except the electroluminescent light source used was a 2.3 mm outside diameter by approximately 1meter long NEW BLUE EL light fiber, from ELAM, Inc., at a power of 140 VAC at 10 kHz. Results are tabulated in Table 2.

TABLE 2

| Total Illumination Time, minutes | Total Width of Cure, mm | Net Cure Depth, mm |
| --- | --- | --- |
| 15 | 5.72 | 1.71 |
| 30 | 6.25 | 1.975 |
| 60 | 7.82 | 2.76 |
| 95 | 8.65 | 3.175 |
| 120 | 8.69 | 3.195 |
| 150 | 8.85 | 3.275 |

The above data show increased cure depth in the curable resin over time as compared to Example 1.

EXAMPLE 3

A base solution was made by mixing together using a spatula in an opaque plastic container 9 grams CR3 and 1 gram CR4. To this mixture was added 0.05 grams SN1, 0.015 grams ED1, 0.01 grams DYE2, and 0.20 grams PI2 to form a slightly orange colored fluid mixture.

Approximately 1 milliliter of this mixture was placed in a small glass vial of about 1.2 cm. inside diameter. The free end of an approximately 1.2 m long by 1.2 mm outside diameter electroluminescent light fiber, commercially available as HI-BRITE BLUE, from ELAM, Inc., was positioned vertically in the fluid and held in place at a temperature of 72° F. (20° C.) with a clamping fixture. The EL fiber was powered with 212 volts AC at approximately 21 kHz, and produced 13.3 Lux of light per centimeter of length. A layer of curing epoxy formed around the wire immersed in the mixture. The diameter of this curing layer was measured at various times of illumination, The results are listed in Table 3.

TABLE 3

| Total Illumination Time, minutes | Total Diameter of Cure, mm | NCD mm |
| --- | --- | --- |
| 10 | 3.94 | 1.28 |
| 20 | 4.39 | 1.51 |
| 60 | 7.42 | 3.02 |

After a day with no additional light, at room temperature, the material in the vial had thickened substantially beyond the initial gelled region. After several days more, the entire mass had hardened to a glassy solid.

The invention is not limited to the specific embodiments illustrated above which are illustrative and not restrictive. It may be embodied in other specific forms without departing from the scope of the invention which is indicated in the claims.

What is claimed is:

1. A method of curing a curable composition comprising the steps of:
    (a) providing a curable composition on an opaque substrate that is covered by an article opaque to ultraviolet and visible light such that the curable composition is inaccessible to light from the side of the opaque article opposite the side covering the curable composition;
    (b) providing an electroluminescent light source having a light emitting region, said light source being on the same side of the opaque article as the curable composition;
    (c) placing said light emitting region adjacent to the curable composition; and
    (d) curing the curable composition by exposing the curable composition to light emitted from the light emitting region of the electroluminescent light source.

2. The method of claim 1, wherein the electroluminescent light source comprises a mass of phosphor particles dispersed in a binder positioned between a first electrode and a second electrode which phosphor particles emit light when excited by a capacitively coupled electric field.

3. The method of claim 2, wherein at least one of the first or the second electrode is transparent.

4. The method of claim 3, wherein at least one electrode comprises a transparent layer of indium tin oxide.

5. The method of claim 2, wherein the electroluminescent light source comprises a central core electrode; a layer of an electroluminescent phosphor surrounding said central core electrode; and a transparent outer electrode surrounding said layer of electroluminescent phosphor said transparent outer electrode defining the light emitting region of the electroluminescent light source.

6. The method of claim 5, wherein the electroluminescent light source is in the form of a cable having an outer surface defining the light emitting region.

7. The method of claim 6, wherein the electroluminescent light source is encased by a removable sheath from which the light source can be removed.

8. The method of claim 1 in which the curable composition is an adhesive and the electroluminescent light source is positioned in contact with the curable composition.

9. The method of claim 1 wherein the electroluminescent light source emits light having a wavelength ranging from about 300 nm to about 1200 nm.

10. The method of claim 6 in which the curable composition has an irregular shape is selected from bond lines for bonding glass to an automobile or boat, bond lines for panel bonds on an automobile or boat, and bond lines for a boat hull, and the electroluminescent cable is positioned to conform to the irregular shape.

11. The method of claim 1 in which the curable composition comprises a compound containing a silicon-bonded hydrogen and a compound containing aliphatic unsaturation.

12. The method of claim 1 in which the curable composition is curable by reactive intermediates selected from free radicals and reactive cations.

13. The method of claim 12 in which the curable composition includes a photo-initiator selected from the group consisting of:
  A. three-component photo-initiator systems comprising an iodonium salt, a sensitizer and a donor;
  B. acylphosphine oxides;
  C. ionic dye-counterion complex initiators comprising a borate anion and a complementary cationic dye; and
  D. borate salt photo-initiators.

14. The method of claim 12 in which the curable composition comprises at least one organic material selected from ethylenically unsaturated compounds polymerizable by cationic mechanism and at least one heterocyclic compound polymerizable by cationic polymerization.

15. The method of claim 14 in which the curable composition includes a catalyst having a cationic photoactive group.

16. The method of claim 14 in which the curable composition includes a photo-initiator comprising a three-component photo-initiator system comprising an iodonium salt, a sensitizer, and an electron donor.

17. The method of claim 14 in which the curable composition further comprises an hydroxyl-containing material selected from monohydroxy- and polyhydroxy-alcohols.

18. An article comprising a polymeric curable composition on an opaque substrate that is completely covered by an article opaque to ultraviolet and visible light in combination with an electroluminescent light source located on the same side of the opaque article as the curable composition so that the curable composition can be exposed to light emitted from the light source.

19. An article comprising a cured polymeric composition in combination with an electroluminescent light source adjacent to the cured composition, said cured polymeric composition being completely covered by an article opaque to ultraviolet and visible light and being located on the same side of the opaque article as the electroluminescent light.

20. The article of claim 19 in which the electroluminescent light source is embedded in the cured polymeric composition.

* * * * *

UNITED STATES PATENT AND TRADEMARK OFFICE
CERTIFICATE OF CORRECTION

PATENT NO. : 7,166,008 B2 Page 1 of 1
APPLICATION NO. : 10/744260
DATED : January 23, 2007
INVENTOR(S) : Robert J. Boettcher It is certified that error appears in the above-identified patent and that said Letters Patent is hereby corrected as shown below:

Column 2
Line 19-20, delete the word "electroluminscent" and insert in place thereof -- electroluminescent --.
Line 28, delete the word "electroluminscent" and insert in place thereof -- electroluminescent --.

Column 3
Line 17, delete "rm." and insert in place thereof -- nm. --.

Column 9
Line 20, delete "$Cl^{31}$, $Br^{31}$," and insert in place thereof -- $Cl^-$, $Br^-$, --.
Line 21, delete "$C^4H_5SO_3^{31}$;" and insert in place thereof -- $C_4H_5SO_3^-$; --.
Line 22, delete "$SbF_5OH^{31}$" and insert in place thereof -- $SbF_5OH^-$ --.
Line 23, delete "$AsF_6^{31}$." and insert in place thereof -- $AsF_6^-$. --.
Line 23, delete the word "Iodonium" and insert in place thereof -- iodonium --.

Column 13
Line 45, delete the word "1meter" and insert in place thereof -- 1 meter --.

Column 15
Line 14, in claim 10, after "shape" delete "is".

Signed and Sealed this

Second Day of October, 2007

JON W. DUDAS
*Director of the United States Patent and Trademark Office*